US009590766B2

(12) United States Patent
Zeng et al.

(10) Patent No.: US 9,590,766 B2
(45) Date of Patent: Mar. 7, 2017

(54) PEAK ELIMINATION DEVICE AND METHOD FOR MULTICARRIER BASEBAND

(71) Applicant: ZTE CORPORATION, Guangdong (CN)

(72) Inventors: Feng Zeng, Shenzhen (CN); Weiming Pan, Shenzhen (CN); Dameng Ren, Shenzhen (CN); Yuping Cui, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 17 days.

(21) Appl. No.: 14/438,608

(22) PCT Filed: Sep. 13, 2013

(86) PCT No.: PCT/US2013/083458
§ 371 (c)(1),
(2) Date: Apr. 24, 2015

(87) PCT Pub. No.: WO2014/063539
PCT Pub. Date: May 1, 2014

(65) Prior Publication Data
US 2016/0261372 A1 Sep. 8, 2016

(30) Foreign Application Priority Data
Oct. 25, 2012 (CN) .......................... 2012 1 0413020

(51) Int. Cl.
H04L 27/00 (2006.01)
H04L 1/00 (2006.01)
H04L 27/26 (2006.01)

(52) U.S. Cl.
CPC ........ H04L 1/0042 (2013.01); H04L 27/2614 (2013.01)

(58) Field of Classification Search
CPC ........... H04L 25/03343; H04L 27/2601; H04L 27/2614; H04L 27/2626;
(Continued)

(56) References Cited

U.S. PATENT DOCUMENTS

2005/0141408 A1 6/2005 Anvari
2007/0254592 A1* 11/2007 McCallister .......... H03F 1/0205
455/67.11

FOREIGN PATENT DOCUMENTS

CN 101076008 11/2007
CN 101136890 3/2008
(Continued)

OTHER PUBLICATIONS

European Search Report received in European Patent Application No. 13849344.0 on Sep. 15, 2015, 8 pages.
(Continued)

Primary Examiner — Rahel Guarino
(74) Attorney, Agent, or Firm — Foley & Lardner LLP

(57) ABSTRACT

A multicarrier baseband peak elimination device and method are disclosed. The device includes: K branches, a peak selection module, an error signal generation module, and an adder; wherein K is an integer greater than 1; and each branch includes a delayer, a digital up conversion module, a first numerically controlled oscillator, a first multiplier, a second numerically controlled oscillator, a second multiplier, a digital down conversion module, an offset pulse generation module, and a subtractor.

14 Claims, 3 Drawing Sheets

(58) Field of Classification Search
CPC ......... H04L 2025/03414; H04L 1/0042; H04L 27/2615; H04B 1/0475; H04B 2201/70706
USPC .......................... 375/260, 295, 349; 327/309
See application file for complete search history.

(56) References Cited

FOREIGN PATENT DOCUMENTS

| | | |
|---|---|---|
| EP | 1469649 | 10/2004 |
| EP | 1 802 065 | 6/2007 |
| JP | 2003-510898 | 3/2003 |
| JP | 2009-535924 | 10/2009 |
| WO | WO-2007/091434 | 8/2007 |

OTHER PUBLICATIONS

Japanese Office Action dated Jan. 12, 2016, from related Japanese Patent Application No. 2015-538264. (No English Translation Available).
International Search Report mailed Dec. 12, 2013, from related international application No. PCT/CN2013/083458 (3 pages).

* cited by examiner

PEAK ELIMINATION DEVICE AND METHOD FOR MULTICARRIER BASEBAND

CROSS-REFERENCE TO RELATED APPLICATIONS

The present application is a U.S. National Phase of International Patent Application No. PCT/CN2013/083458, filed Sep. 13, 2013, which claims priority from Chinese Patent Application No. 201210413020.2, filed Oct. 25, 2012. The contents of these applications are incorporated herein by reference in their entirety.

TECHNICAL FIELD

The present document relates to the mobile communication technology, and particularly, to a multicarrier baseband peak elimination device and method.

BACKGROUND

With the rapid development of the mobile communication technology, mobile communication has become an indispensable tool in people's daily work and life. For a base station, how to guarantee possessing higher power amplifier efficiency is a key problem, wherein an important aspect is how to reduce a signal peak-to-average ratio of baseband signals.

SUMMARY

The embodiments of the present document provide a multicarrier baseband peak elimination device and method, solving the problem of the demand of reducing a peak-to-average ratio of baseband signals.

The embodiments of the present document provide a multicarrier baseband peak elimination device, comprising: K branches, a peak selection module, an error signal generation module, and an adder; wherein, K is an integer greater than 1; each branch comprises a delayer, a digital up conversion module, a first numerically controlled oscillator, a first multiplier, a second numerically controlled oscillator, a second multiplier, a digital down conversion module, an offset pulse generation module, and a subtractor;

an input end of the digital up conversion module and an input end of the delayer are used for connecting baseband signals, an output end of the digital up conversion module is connected to an input end of the first multiplier, an output end of the first numerically controlled oscillator is connected to the input end of the first multiplier, an output end of a first multiplier of the K branches is connected to an input end of the adder, an output end of the adder is orderly connected to the peak selection module and the error signal generation module, an output end of the error signal generation module is connected to one input end of a second multiplier in the K branches, an output end of the second numerically controlled oscillator is connected to the other input end of the second multiplier, an output end of the second multiplier is orderly connected to the digital down conversion module and the offset pulse generation module, an output end of the offset pulse generation module is connected to a minuend end of the subtractor, and an output end of the delayer is connected to a subtrahend end of the subtractor;

the digital up conversion module is configured to: perform N-times upsampling interpolation filtering for an input baseband signal;

the digital down conversion module is configured to: perform N-times downsampling decimation filtering for an input baseband signal;

the first numerically controlled oscillator is configured to: generate a complex signal with a preset frequency;

the second numerically controlled oscillator is configured to: generate a signal at the same frequency as and conjugated with the first numerically controlled oscillator;

the peak selection module is configured to: screen out a peak signal with an amplitude exceeding a preset threshold in combiner signals output by the adder, and output a peak signal amplitude, a combiner signal phase, and location information of the peak signal in the combiner signals;

the error signal generation module is configured to: calculate a product of the peak signal amplitude and the combiner signal phase to obtain an error signal, and output the error signal and the location information; and the offset pulse generation module is configured to: generate a peak elimination sequence at a location corresponding to the location information according to the location information and multiply the peak elimination sequence by an input signal and then output.

The above device may be further characterized in that: the peak selection module is configured to output a peak signal amplitude, a combiner signal phase, and location information of the peak signal in the combiner signals by means of:

outputting the peak signal amplitude, the combiner signal phase, and the location information to the error signal generation module;

the error signal generation module is configured to output the error signal and the location information by means of:

outputting the error signal to the second multiplier, and outputting the location information to the digital down conversion module; and the digital down conversion module is further configured to: output the location information to the offset pulse generation module.

The above device may be further characterized in that: an output end of the peak selection module is connected to an input end of the offset pulse generation module;

the peak selection module is configured to output a peak signal amplitude, a combiner signal phase, and location information of the peak signal in the combiner signals by means of:

outputting the peak signal amplitude and the combiner signal phase to the error signal generation module, and outputting the location information to the offset pulse generation module.

The above device may be further characterized in that: the error signal generation module is configured to calculate a product of the peak signal amplitude and the combiner signal phase to obtain an error signal by means of:

after calculating a complex number with a real part being a cosine function of the combiner signal phase and an imaginary part being a sine function of the combiner signal phase, calculating a product of the complex number and the peak signal amplitude to obtain the error signal.

The above device may be further characterized in that: the offset pulse generation module is configured to generate a peak elimination sequence at a location corresponding to the location information and multiply the peak elimination sequence by an input signal by means of:

circularly shifting a peak elimination core sequence to align a maximum amplitude location of the peak elimination core sequence with a location indicated by location information of the input signal and then multiplying the peak elimination core sequence by the input signal; or generating a shaped pulse and then multiplying the input signal by the shaped pulse.

The embodiments of the present document further provide a multicarrier baseband peak elimination device, comprising: K branches, an adder, a peak selection module, an error signal generation module, and an offset pulse generation module; wherein, K is an integer greater than 1; and each branch comprises a delayer, a digital up conversion module, a first numerically controlled oscillator, a first multiplier, a second numerically controlled oscillator, a second multiplier, a digital down conversion module, and a subtractor;

an input end of the digital up conversion module and an input end of the delayer are used for connecting baseband signals, an output end of the digital up conversion module is connected to an input end of the first multiplier, an output end of the first numerically controlled oscillator is connected to the input end of the first multiplier, an output end of a first multiplier of the K branches is connected to an input end of the adder, an output end of the adder is orderly connected to the peak selection module, the error signal generation module and the offset pulse generation module, an output end of the offset pulse generation module is connected to one input end of a second multiplier in the K branches, an output end of the second numerically controlled oscillator is connected to the other input end of the second multiplier, an output end of the second multiplier is connected to an input end of the digital down conversion module, an output end of the digital down conversion module is connected to a minuend end of the subtractor, and an output end of the delayer is connected to a subtrahend end of the subtractor;

the digital up conversion module is configured to: perform N-times upsampling interpolation filtering for an input baseband signal;

the digital down conversion module is configured to: perform N-times downsampling decimation filtering for an input baseband signal;

the first numerically controlled oscillator is configured to: generate a complex signal with a preset frequency;

the second numerically controlled oscillator is configured to: generate a signal at the same frequency as and conjugated with the first numerically controlled oscillator;

the peak selection module is configured to: screen out a peak signal with an amplitude exceeding a preset threshold in combiner signals output by the adder, and output a peak signal amplitude, a combiner signal phase, and location information of the peak signal in the combiner signals;

the error signal generation module is configured to: calculate a product of the peak signal amplitude and the combiner signal phase to obtain an error signal, and output the error signal and the location information; and the offset pulse generation module is configured to: generate a peak elimination sequence at a location corresponding to the location information according to the location information, and multiply the peak elimination sequence by an input signal and then output.

The above device may be further characterized in that:

the error signal generation module is configured to calculate a product of the peak signal amplitude and the combiner signal phase to obtain an error signal by means of:

after calculating a complex number with a real part being a cosine function of the combiner signal phase and an imaginary part being a sine function of the combiner signal phase, calculating a product of the complex number and the peak signal amplitude to obtain the error signal.

The above device may be further characterized in that:

the offset pulse generation module is configured to generate a peak elimination sequence at a location corresponding to the location information and multiply the peak elimination sequence by an input signal by means of:

circularly shifting a peak elimination core sequence to align a maximum amplitude location of the peak elimination core sequence with a location indicated by location information of the input signal and then multiplying the peak elimination core sequence by the input signal; or generating a shaped pulse and then multiplying the input signal by the shaped pulse.

The embodiments of the present document further provide a multicarrier baseband peak elimination method, comprising:

performing N-times upsampling interpolation filtering for a baseband signal through each branch of K branches and then multiplying the baseband signal by a complex signal with a preset frequency, wherein K is an integer greater than 1; adding the signals obtained by multiplying in the K branches to obtain combiner signals, screening out a peak signal with an amplitude exceeding a preset threshold in the combiner signals, and outputting a peak signal amplitude, a combiner signal phase, and location information of the peak signal in the combiner signals;

calculating a product of the peak signal amplitude and the combiner signal phase to obtain an error signal; and in each branch of the K branches, multiplying the error signal by a conjugated signal of the complex signal with the preset frequency, performing N-times downsampling decimation filtering for the signals obtained by multiplying to obtain a filtered signal, generating a peak elimination sequence at a location corresponding to the location information according to the location information and multiplying the peak elimination sequence by the filtered signal to obtain a product signal, and delaying the baseband signal and then subtracting the product signal to obtain a baseband peak elimination signal.

The embodiments of the present document further provide a multicarrier baseband peak elimination method, comprising:

performing N-times upsampling interpolation filtering for a baseband signal through each branch of K branches and then multiplying the baseband signal by a complex signal with a preset frequency, wherein K is an integer greater than 1; adding the signals obtained by multiplying in the K branches to obtain combiner signals, screening out a peak signal with an amplitude exceeding a preset threshold in the combiner signals, and outputting a peak signal amplitude, a combiner signal phase, and location information of the peak signal in the combiner signals;

calculating a product of the peak signal amplitude and the combiner signal phase to obtain an error signal;

generating a peak elimination sequence at a location corresponding to the location information according to the location information and multiplying the peak elimination sequence by the error signal to obtain a product signal; and in each branch of the K branches, multiplying the product signal by a conjugated signal of the complex signal with the preset frequency, performing N-times downsampling decimation filtering for the signals obtained by multiplying to obtain a filtered signal, and delaying the baseband signal and then subtracting the filtered signal to obtain a baseband peak elimination signal.

In the embodiments of the present document, support for multicarrier is implemented, which can effectively reduce a peak-to-average ratio of the baseband output signals. After using the baseband peak elimination scheme of the embodiments of the present document, pressure of mid-frequency peak elimination can be relieved, thereby improving the overall peak elimination performance.

PREFERRED EMBODIMENTS OF THE DOCUMENT

The embodiments of the present document will be expounded in combination with the accompanying drawings as below. It should be noted that the embodiments in the present application and the features in the embodiments can be optionally combined with each other in case of no conflict.

Figure 1:
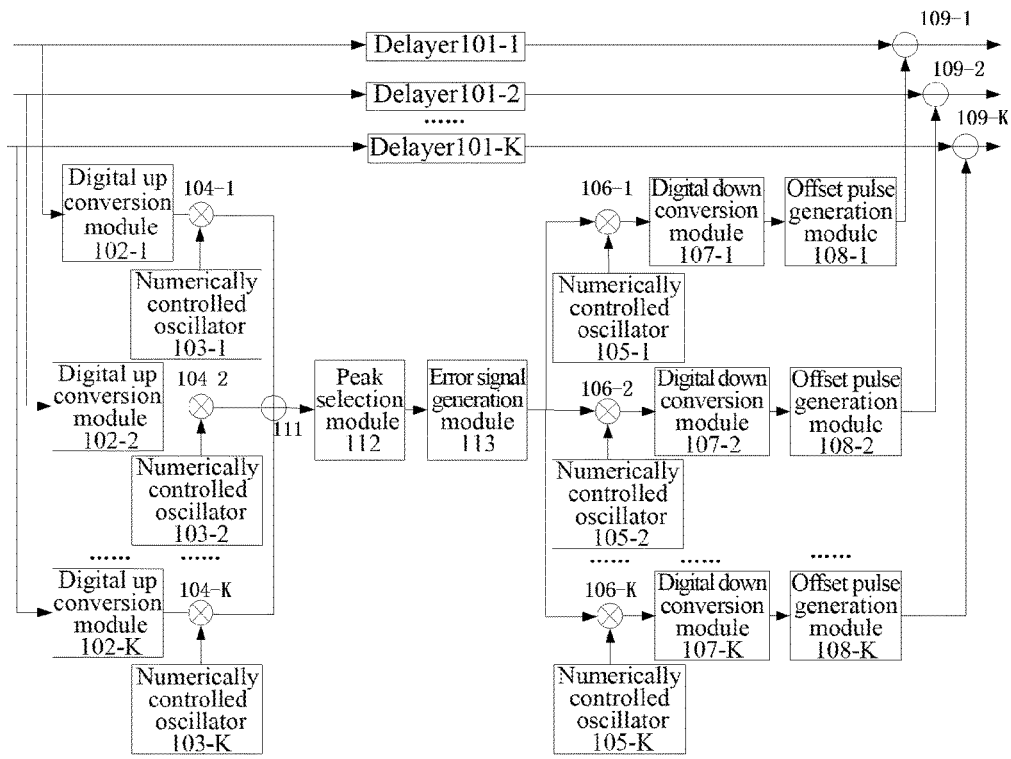
FIG. 1 is a structure chart of a multicarrier baseband peak elimination device in the scheme of one embodiment of the present document.

As shown in FIG. 1, a multicarrier baseband peak elimination device includes K branches, K being an integer greater than 1, each branch including a delayer 101, a digital up conversion module 102, a first numerically controlled oscillator 103, a first multiplier 104, a second numerically controlled oscillator 105, a second multiplier 106, a digital down conversion module 107, an offset pulse generation module 108 and a subtractor 109. The device also includes an adder 111, a peak selection module 112 and an error signal generation module 113.

In each branch, an input end of the digital up conversion module 102 and an input end of the delayer 101 are used for connecting baseband signals, an output end of the digital up conversion module 102 is connected to an input end of the first multiplier 104, an output end of the first numerically controlled oscillator 103 is connected to the input end of the first multiplier 104, an output end of a first multiplier 104 of the K branches is connected to an input end of the adder 111, an output end of the adder 111 is orderly connected to the peak selection module 112 and the error signal generation module 113, an output end of the error signal generation module 113 is connected to one input end of a second multiplier 106 in the K branches, an output end of the second numerically controlled oscillator 105 in each branch is connected to the other input end of the second multiplier 106, an output end of the second multiplier 106 is orderly connected to the digital down conversion module 107 and the offset pulse generation module 108, an output end of the offset pulse generation module 108 is connected to a minuend end of the subtractor 109, and an output end of the delayer 101 is connected to a subtrahend end of the subtractor 109.

The digital up conversion module 102 is used to perform N-times upsampling interpolation filtering for an input baseband signal;

the digital down conversion module 107 is used to perform N-times downsampling decimation filtering for an input baseband signal;

the first numerically controlled oscillator 103 is used to generate a complex signal with a preset frequency;

the second numerically controlled oscillator 105 is used to generate a signal at the same frequency as and conjugated with the first numerically controlled oscillator 103;

the peak selection module 112 is used to screen out a peak signal with an amplitude exceeding a preset threshold in combiner signals output by the adder 111, and output a peak signal amplitude, a combiner signal phase, and location information of the peak signal in the combiner signals;

the error signal generation module 113 is used to calculate a product of the peak signal amplitude and the combiner signal phase to obtain an error signal, and output the error signal and the location information; and the offset pulse generation module 108 is used to generate a peak elimination sequence at a location corresponding to the location information according to the above location information and multiply the peak elimination sequence by an input signal and then output.

Wherein, the peak selection module 112 is used to output the peak signal, the peak signal amplitude, the combiner signal phase and the location information to the error signal generation module 113; the error signal generation module 113 is used to output the error signal to the second multiplier 106, and output the location information to the digital down conversion module 107; the digital down conversion module 107 is also used to output the location information to the offset pulse generation module 108. Or, an output end of the peak selection module 112 is connected to an input end of each offset pulse generation module 108; and the peak selection module 112 is used to output the peak signal amplitude and the combiner signal phase to the error signal generation module 113 and output the location information to the offset pulse generation module 108.

Figure 2:
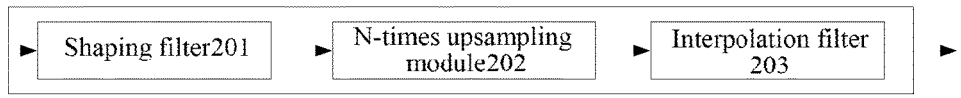
FIG. 2 is a schematic diagram of a digital up conversion module according to one embodiment of the present document.

As shown in FIG. 2, the digital up conversion module 102 includes a shaping filter 201, an N-times upsampling module 202 and a plurality of interpolation filters 203. The shaping filter 201 is used to shape an input signal into a pulse. The N-times upsampling module 202 is used to increase a signal sampling rate by N times. The interpolation filters 203 are used to filter mirror signals. After signals go through the digital up conversion module 102, a baseband carrier signal is interpolated and filtered to an N-times sampling rate.

The first numerically controlled oscillator 103 is used to generate a complex signal at a specified frequency with a real part thereof being a cosine wave and an imaginary part thereof being a sine signal. After multiplying the output data of the digital up conversion module 102 by the output data of the first numerically controlled oscillator 103, the purpose of frequency domain movement can be achieved. After adding signals of the K branches, K carriers can be differentiated in the frequency domain.

Figure 3:
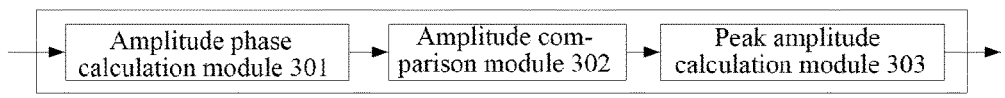
FIG. 3 is a schematic diagram of a peak selection module according to one embodiment of the present document.

As shown in FIG. 3, the peak selection module 112 includes an amplitude phase calculation module 301, an amplitude comparison module 302 and a peak amplitude calculation module 303. The amplitude phase calculation module 301 is used to calculate to obtain signal amplitude or phase according to signals in the form of complex number. The amplitude comparison module 302 is used to compare the signal amplitude with a preset threshold, and if the signal amplitude is greater than the threshold, a peak amplitude output by the peak amplitude calculation module 303 is a value of subtracting the threshold from the signal amplitude, and if the signal amplitude is less than or equal to the threshold, the peak amplitude output by the peak amplitude calculation module 303 is zero.

Figure 4:
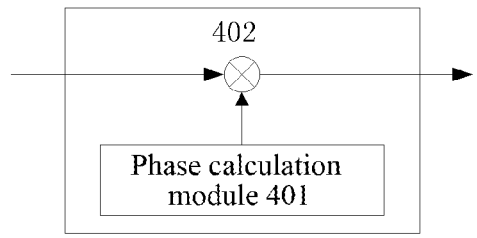
FIG. 4 is a schematic diagram of an error signal generation module according to one embodiment of the present document.

As shown in FIG. 4, the error signal generation module 113 includes a phase calculation module 401 and a multiplier 402, the phase calculation module 401 being used to calculate a phase angle into a complex number with a real part being a cosine function of the phase angle and an imaginary part being a sine function of the phase angle, and the multiplier 402 being used to multiply the complex number output by the phase calculation module 401 by an input signal, and perform calculation to obtain an error signal.

Figure 5:
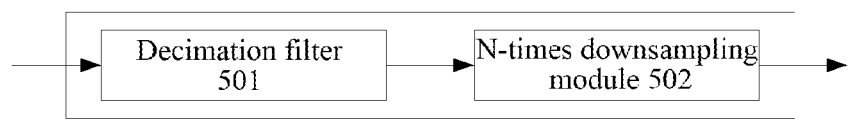
FIG. 5 is a schematic diagram of a digital down conversion module according to one embodiment of the present document.

As shown in FIG. 5, the digital down conversion module 107 includes: a decimation filter 501 used to resist aliasing; and an N-times downsampling module 502 used to reduce a signal sampling rate by N times to restore to the original signal sampling rate.

Figure 6:
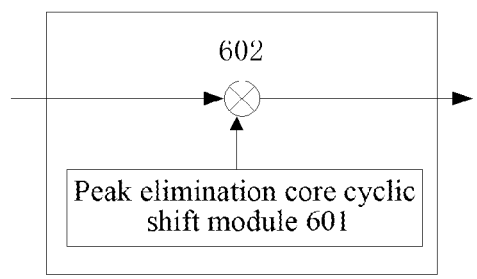
FIG. 6 is a schematic diagram of an offset pulse generation module according to one embodiment of the present document.
Figure 7:
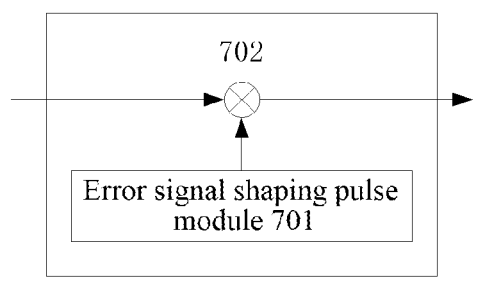
FIG. 7 is another schematic diagram of an offset pulse generation module according to one embodiment of the present document.

The offset pulse generation module 108 can be implemented in different ways, for example, a lossless way in FIG. 6 and a lossy way in FIG. 7.

As shown in FIG. 6, the offset pulse generation module 108 includes a peak elimination core cyclic shift module 601 and a multiplier 602, the peak elimination core cyclic shift module 601 being used to circularly shift a peak elimination core sequence to align a maximum amplitude location of the peak elimination core sequence with a location indicated by location information of the input signal, and the multiplier 602 being used to multiply the signal of the peak elimination core cyclic shift module 601 by the input signal to obtain an offset pulse sequence.

As shown in FIG. 7, the offset pulse generation module 108 includes an error signal shaping pulse module 701 and a multiplier 702, the error signal shaping pulse module 701 being used to generate a shaped pulse, and the multiplier 702 being used to multiply the generated shaped pulse by an input signal to obtain an offset pulse sequence.

Under the structure of this device, a multicarrier baseband peak elimination method includes: performing N-times upsampling interpolation filtering for a baseband signal through each branch of K branches and then multiplying the baseband signal by a complex signal with a preset frequency, wherein K is an integer greater than 1; adding signals obtained by multiplying in the K branches to obtain combiner signals, screening out a peak signal with an amplitude exceeding a preset threshold in the combiner signals, and outputting a peak signal amplitude, a combiner signal phase, and location information of the peak signal in the combiner signals; calculating a product of the peak signal amplitude and the combiner signal phase to obtain an error signal; and in each branch of the K branches, multiplying the error signal by a conjugated signal of the complex signal with the preset frequency, performing N-times downsampling decimation filtering for the signals obtained by multiplying to obtain a filtered signal, generating a peak elimination sequence at a location corresponding to the location information according to the location information and multiplying the peak elimination sequence by the filtered signal to obtain a product signal, and delaying the baseband signal and then subtracting the product signal to obtain a baseband peak elimination signal.

Figure 8:
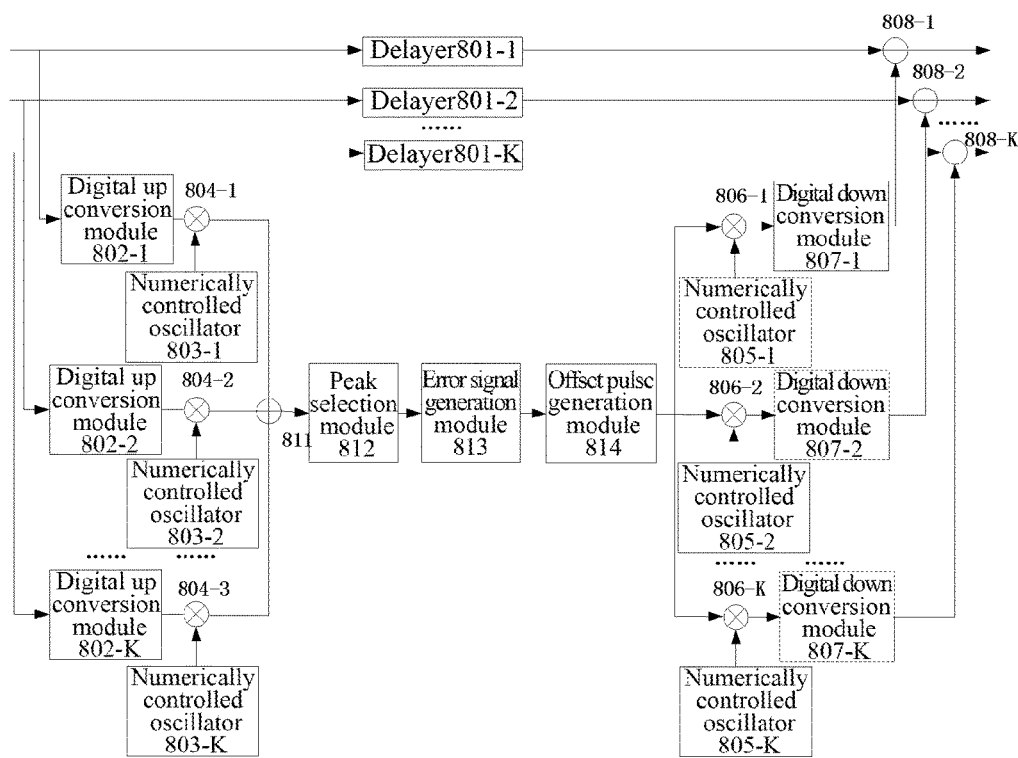
FIG. 8 is another structure chart of a multicarrier baseband peak elimination device in the scheme of one embodiment of the present document.

As shown in FIG. 8, another multicarrier baseband peak elimination device includes K branches, K being an integer greater than 1, each branch including a delayer 801, a digital up conversion module 802, a first numerically controlled oscillator 803, a first multiplier 804, a second numerically controlled oscillator 805, a second multiplier 806, a digital down conversion module 807, and a subtractor 808. The device also includes an adder 811, a peak selection module 812, an error signal generation module 813, and an offset pulse generation module 814.

In each branch, an input end of the digital up conversion module 802 and an input end of the delayer 801 are used for connecting baseband signals, an output end of the digital up conversion module 802 is connected to an input end of the first multiplier 804, an output end of the first numerically controlled oscillator 803 is connected to the input end of the first multiplier 804, an output end of a first multiplier 804 of the K branches is connected to an input end of the adder 811, an output end of the adder 811 is orderly connected to the peak selection module 812, the error signal generation module 813 and the offset pulse generation module 814, an output end of the offset pulse generation module 814 is connected to one input end of a second multiplier 806 in the K branches, an output end of the second numerically controlled oscillator 805 in each branch is connected to the other input end of the second multiplier 806, an output end of the second multiplier 806 is connected to an input end of the digital down conversion module 807, an output end of the digital down conversion module 807 is connected to a minuend end of the subtractor 808, and an output end of the delayer 801 is connected to a subtrahend end of the subtractor 808.

The digital up conversion module 802 is used to perform N-times upsampling interpolation filtering for an input baseband signal;

the digital down conversion module 807 is used to perform N-times downsampling decimation filtering for an input baseband signal;

the first numerically controlled oscillator 803 is used to generate a complex signal with a preset frequency;

the second numerically controlled oscillator 805 is used to generate a signal at the same frequency as and conjugated with the first numerically controlled oscillator;

the peak selection module 812 is used to screen out a peak signal with an amplitude exceeding a preset threshold in combiner signals output by the adder 811, and output a peak signal amplitude, a combiner signal phase, and location information of the peak signal in the combiner signals;

the error signal generation module 813 is used to calculate a product of the peak signal amplitude and the combiner signal phase to obtain an error signal, and output the error signal and the location information; and the offset pulse generation module 814 is used to generate a peak elimination sequence at a location corresponding to the location information according to the location information of the input signal, and multiply the peak elimination sequence by the input signal and then output.

In this device, a multicarrier baseband peak elimination method includes: performing N-times upsampling interpolation filtering for a baseband signal through each branch of K branches and then multiplying the baseband signal by a complex signal with a preset frequency, wherein K is an integer greater than 1; adding the signals obtained by multiplying in the K branches to obtain combiner signals, screening out a peak signal with an amplitude exceeding a preset threshold in the combiner signals, and outputting a peak signal amplitude, a combiner signal phase, and location information of the peak signal in the combiner signals; calculating a product of the peak signal amplitude and the combiner signal phase to obtain an error signal; and generating a peak elimination sequence at a location corresponding to the location information according to the location information and multiplying the peak elimination sequence by the error signal to obtain a product signal; and in each branch of the K branches, multiplying the product signal by a conjugated signal of the complex signal with the preset frequency, performing N-times downsampling decimation filtering for the signals obtained by multiplying to obtain a filtered signal, and delaying the baseband signal and then subtracting the filtered signal to obtain a baseband peak elimination signal.

The structures and functions of the respective modules are the same as that described in the device shown in FIG. 1, which will not be repeated here. A main difference between the device in FIG. 1 and the device in FIG. 8 is that locations of the offset pulse generation module are different. The offset pulse generation module in FIG. 1 is implemented at a low sampling rate, while the offset pulse generation module in FIG. 8 is implemented at a high sampling rate, and the implementation flows thereof are completely the same. By comparing the two figures, the implementation way at low sampling in FIG. 1 is more advantageous.

With the baseband peak elimination technology of this scheme, in combination with the previous mid-frequency peak elimination technology, a complete base station peak elimination technology can be constructed.

Certainly, the present document also can have other various embodiments, those skilled in the art can make various corresponding variations and modifications according to the embodiments of the present document without departing from the spirit and essence of the present document, and these corresponding variations and modifications shall all fall into the protection scope of the appended claims of the present document.

The person skilled in the art can understand that all or part of the steps in the above method can be completed by a program instructing related hardware, and the program can be stored in a computer readable memory medium, such as a Read-Only Memory, disk or optical and disk. Alternatively, all or part of the steps of the above embodiments also can be implemented by using one or multiple integrated circuits. Correspondingly, each module/unit in the above embodiments can be implemented in the form of hardware, and can also be implemented in the form of software function module. The embodiments of the present document are not limited to the combination of hardware and software in any specific form.

INDUSTRIAL APPLICABILITY

In the embodiments of the present document, a peak-to-average ratio of baseband output signals can be reduced effectively, and pressure of mid-frequency peak elimination can be relieved, thereby improving the overall peak elimination performance.

What is claimed is:
1. A multicarrier baseband peak elimination device, comprising: K branches, a peak selection module, an error signal generation module, and an adder; wherein,
K is an integer greater than 1; each branch comprises a delayer, a digital up conversion module, a first numerically controlled oscillator, a first multiplier, a second numerically controlled oscillator, a second multiplier, a digital down conversion module, an offset pulse generation module, and a subtractor;
an input end of the digital up conversion module and an input end of the delayer are used for connecting baseband signals, an output end of the digital up conversion module is connected to an input end of the first multiplier, an output end of the first numerically controlled oscillator is connected to the input end of the first multiplier, an output end of the first multiplier of the K branches is connected to an input end of the adder, an output end of the adder is connected in sequence to the peak selection module and the error signal generation module, an output end of the error signal generation module is connected to one input end of the second multiplier in the K branches, an output end of the second numerically controlled oscillator is connected to the other input end of the second multiplier, an output end of the second multiplier is orderly connected to the digital down conversion module and the offset pulse generation module, an output end of the offset pulse generation module is connected to a minuend end of the subtractor, and an output end of the delayer is connected to a subtrahend end of the subtractor;
the digital up conversion module is configured to: perform N-times upsampling interpolation filtering on an input baseband signal;
the digital down conversion module is configured to: perform N-times downsampling decimation filtering on an input baseband signal;
wherein N is an integer greater than or equal to 1;
the first numerically controlled oscillator is configured to: generate a complex signal with a preset frequency;
the second numerically controlled oscillator is configured to: generate a signal at the same preset frequency as and conjugated with the complex signal generated by the first numerically controlled oscillator;
the peak selection module is configured to: screen out a peak signal with an amplitude exceeding a preset threshold in a combined signal output by the adder, and output a peak signal amplitude, a combined signal phase, and location information of the peak signal in the combined signal;
the error signal generation module is configured to: calculate a product of the peak signal amplitude and the combined signal phase to obtain an error signal, and output the error signal and the location information of the peak signal in the combined signal; and
the offset pulse generation module is configured to: generate a peak elimination sequence at a location corresponding to the location information of the peak signal in the combined signal according to the location information of the peak signal in the combined signal and multiply the peak elimination sequence by an input signal and then output.
2. The device according to claim 1, wherein,
the peak selection module is configured to output the peak signal amplitude, the combined signal phase, and the location information of the peak signal in the combined signals by:
outputting the peak signal amplitude, the combined signal phase, and the location information of the peak signal in the combined signal to the error signal generation module;

the error generation module is configured to output the error signal and the location information of the peak signal in the combined signal by:
outputting the error signal to the second multiplier, and outputting the location information of the peak signal in the combined signal to the digital down conversion module; and
the digital down conversion module is further configured to: output the location information of the peak signal in the combined signal to the offset pulse generation module.

3. The device according to claim 1, wherein,
an output end of the peak selection module is connected to an input end of the offset pulse generation module;
the peak selection module is configured to output the peak signal amplitude, the combined signal phase, and the location information of the peak signal in the combined signals by:
outputting the peak signal amplitude and the combined signal phase to the error signal generation module, and outputting the location information of the peak signal in the combined signal to the offset pulse generation module.

4. The device according to claim 1, wherein,
the error signal generation module is configured to calculate the product of the peak signal amplitude and the combined signal phase to obtain the error signal by:
after calculating a complex number with a real part being a cosine function of the combined signal phase and an imaginary part being a sine function of the combined signal phase, calculating a product of the complex number and the peak signal amplitude to obtain the error signal.

5. The device according to claim 1, wherein,
the offset pulse generation module is configured to generate the peak elimination sequence at the location corresponding to the location information of the peak signal in the combined signal and multiply the peak elimination sequence by the input signal by:
circularly shifting a peak elimination core sequence to align a maximum amplitude location of the peak elimination core sequence with a location indicated by location information of the input signal and then multiplying by the input signal; or generating a shaped pulse and then multiplying the input signal by the shaped pulse.

6. A multicarrier baseband peak elimination device, comprising: K branches, an adder, a peak selection module, an error signal generation module, and an offset pulse generation module; wherein,
K is an integer greater than 1; and each branch comprises a delayer, a digital up conversion module, a first numerically controlled oscillator, a first multiplier, a second numerically controlled oscillator, a second multiplier, a digital down conversion module, and a subtractor;
an input end of the digital up conversion module and an input end of the delayer are used for connecting baseband signals, an output end of the digital up conversion module is connected to an input end of the first multiplier, an output end of the first numerically controlled oscillator is connected to the input end of the first multiplier, an output end of the first multiplier of the K branches is connected to an input end of the adder, an output end of the adder is connected to the peak selection module, the error signal generation module and the offset pulse generation module in sequence, an output end of the offset pulse generation module is connected to one input end of the second multiplier in the K branches, an output end of the second numerically controlled oscillator is connected to the other input end of the second multiplier, an output end of the second multiplier is connected to an input end of the digital down conversion module, an output end of the digital down conversion module is connected to a minuend end of the subtractor, and an output end of the delayer is connected to a subtrahend end of the subtractor;
the digital up conversion module is configured to: perform N-times upsampling interpolation filtering on an input baseband signal;
the digital down conversion module is configured to: perform N-times downsampling decimation filtering on an input baseband signal;
wherein N is an integer greater than or equal to 1;
the first numerically controlled oscillator is configured to: generate a complex signal with a preset frequency;
the second numerically controlled oscillator is configured to: generate a signal at the same preset frequency as and conjugated with the complex signal generated by the first numerically controlled oscillator;
the peak selection module is configured to: screen out a peak signal with an amplitude exceeding a preset threshold in combined signals output by the adder, and output a peak signal amplitude, a combined signal phase, and location information of the peak signal in the combined signals;
the error signal generation module is configured to: calculate a product of the peak signal amplitude and the combined signal phase to obtain an error signal, and output the error signal and the location information of the peak signal in the combined signal; and
the offset pulse generation module is configured to: generate a peak elimination sequence at a location corresponding to the location information of the peak signal in the combined signal according to the location information of the peak signal in the combined signal, and multiply the peak elimination sequence by an input signal and then output.

7. The device according to claim 6, wherein,
the error signal generation module is configured to calculate the product of the peak signal amplitude and the combined signal phase to obtain the error signal by:
after calculating a complex number with a real part being a cosine function of the combined signal phase and an imaginary part being a sine function of the combined signal phase, calculating a product of the complex number and the peak signal amplitude to obtain the error signal.

8. The device according to claim 6, wherein,
the offset pulse generation module is configured to generate the peak elimination sequence at the location corresponding to the location information of the peak signal in the combined signal and multiply the peak elimination sequence by the input signal by:
circularly shifting a peak elimination core sequence to align a maximum amplitude location of the peak elimination core sequence with a location indicated by location information of the input signal and then multiplying the peak elimination core sequence by the input signal; or generating a shaped pulse and then multiplying the input signal by the shaped pulse.

9. A multicarrier baseband peak elimination method, comprising:

performing N-times upsampling interpolation filtering on a baseband signal and then multiplying the baseband signal by a complex signal with a preset frequency through each branch of K branches, wherein N is an integer greater than or equal to 1 and K is an integer greater than 1; adding signals obtained by multiplying in the K branches to obtain a combined signal, screening out a peak signal with an amplitude exceeding a preset threshold in the combined signal, and outputting a peak signal amplitude, a combined signal phase, and location information of the peak signal in the combined signal;

calculating a product of the peak signal amplitude and the combined signal phase to obtain an error signal; and in each branch of the K branches, multiplying the error signal by a conjugated signal of the complex signal with the preset frequency, performing N-times downsampling decimation filtering on the signals obtained by multiplying to obtain a filtered signal, generating a peak elimination sequence at a location corresponding to the location information of the peak signal in the combined signal according to the location information of the peak signal in the combined signal and multiplying the peak elimination sequence by the filtered signal to obtain a product signal, and delaying the baseband signal and then subtracting the product signal to obtain a baseband peak elimination signal.

10. A multicarrier baseband peak elimination method, comprising:

performing N-times upsampling interpolation filtering on a baseband signal and then multiplying the baseband signal by a complex signal with a preset frequency through each branch of K branches, wherein N is an integer greater than or equal to 1 and K is an integer greater than 1; adding the signals obtained by multiplying in the K branches to obtain a combined signal, screening out a peak signal with an amplitude exceeding a preset threshold in the combined signal, and outputting a peak signal amplitude, a combined signal phase, and location information of the peak signal in the combined signal;

calculating a product of the peak signal amplitude and the combined signal phase to obtain an error signal;

generating a peak elimination sequence at a location corresponding to the location information of the peak signal in the combined signal according to the location information of the peak signal in the combined signal and multiplying the peak elimination sequence by the error signal to obtain a product signal; and in each branch of the K branches, multiplying the product signal by a conjugated signal of the complex signal with the preset frequency, performing N-times downsampling decimation filtering on the signals obtained by multiplying to obtain a filtered signal, and delaying the baseband signal and then subtracting the filtered signal to obtain a baseband peak elimination signal.

11. The device according to claim 2, wherein, the error signal generation module is configured to calculate the product of the peak signal amplitude and the combined signal phase to obtain the error signal by:

after calculating a complex number with a real part being a cosine function of the combined signal phase and an imaginary part being a sine function of the combined signal phase, calculating a product of the complex number and the peak signal amplitude to obtain the error signal.

12. The device according to claim 2, wherein, the offset pulse generation module is configured to generate the peak elimination sequence at a location corresponding to the location information of the peak signal in the combined signal and multiply the peak elimination sequence by the input signal by:

circularly shifting a peak elimination core sequence to align a maximum amplitude location of the peak elimination core sequence with a location indicated by location information of the input signal and then multiplying by the input signal; or generating a shaped pulse and then multiplying the input signal by the shaped pulse.

13. The device according to claim 3, wherein, the error signal generation module is configured to calculate the product of the peak signal amplitude and the combined signal phase to obtain the error signal by:

after calculating a complex number with a real part being a cosine function of the combined signal phase and an imaginary part being a sine function of the combined signal phase, calculating a product of the complex number and the peak signal amplitude to obtain the error signal.

14. The device according to claim 3, wherein, the offset pulse generation module is configured to generate the peak elimination sequence at the location corresponding to the location information of the peak signal in the combined signal and multiply the peak elimination sequence by the input signal by:

circularly shifting a peak elimination core sequence to align a maximum amplitude location of the peak elimination core sequence with a location indicated by location information of the input signal and then multiplying by the input signal; or generating a shaped pulse and then multiplying the input signal by the shaped pulse.

* * * * *

UNITED STATES PATENT AND TRADEMARK OFFICE
CERTIFICATE OF CORRECTION

| | | |
|---|---|---|
| PATENT NO. | : 9,590,766 B2 | Page 1 of 1 |
| APPLICATION NO. | : 14/438608 | |
| DATED | : March 7, 2017 | |
| INVENTOR(S) | : Feng Zeng et al. | |

It is certified that error appears in the above-identified patent and that said Letters Patent is hereby corrected as shown below:

On the Title Page

In Item (86) of the Bibliographic data, the priority claim is incorrect. The PCT number should be "PCT/CN2013/083458".

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*